United States Patent
Hartman et al.

(10) Patent No.: US 8,643,850 B1
(45) Date of Patent: Feb. 4, 2014

(54) AUTOMATED SYSTEM FOR LOAD ACQUISITION AND ENGAGEMENT

(76) Inventors: Richard L. Hartman, Huntsville, AL (US); Stephen R. Granade, Madison, AL (US); Joel Hannah, Somerville, AL (US); Arthur B. Caneer, Huntsville, AL (US)

( * ) Notice: Subject to any disclaimer, the term of this patent is extended or adjusted under 35 U.S.C. 154(b) by 0 days.

(21) Appl. No.: 13/200,732

(22) Filed: Sep. 29, 2011

Related U.S. Application Data

(63) Continuation of application No. 12/932,664, filed on Mar. 2, 2011.

(60) Provisional application No. 61/387,515, filed on Sep. 29, 2010, provisional application No. 61/339,259, filed on Mar. 2, 2010.

(51) Int. Cl.
*G01B 11/14* (2006.01)

(52) U.S. Cl.
USPC .......... 356/614; 382/103; 342/29; 356/141.2

(58) Field of Classification Search
USPC ................ 356/614, 615, 620; 250/559.29
See application file for complete search history.

(56) References Cited

U.S. PATENT DOCUMENTS

| | | | | |
|---|---|---|---|---|
| 2,692,121 A * | 10/1954 | Brown | ............ | 258/1.8 |
| 3,508,727 A * | 4/1970 | Willems | ............ | 244/140 |
| 4,141,295 A * | 2/1979 | Campbell et al. | ............ | 102/407 |
| 4,836,778 A | 6/1989 | Baumrind et al. | | |
| 4,896,962 A | 1/1990 | Menn et al. | | |
| 5,828,770 A | 10/1998 | Leis et al. | | |
| 5,884,239 A | 3/1999 | Romanik, Jr. | | |
| 5,987,349 A | 11/1999 | Schultz | | |
| 6,266,142 B1 | 7/2001 | Junkins et al. | | |
| 6,281,797 B1 * | 8/2001 | Forster et al. | ............ | 340/572.3 |
| 6,549,139 B2 * | 4/2003 | Shaw, Jr. | ............ | 340/685 |
| 6,789,768 B1 * | 9/2004 | Kalisch | ............ | 244/190 |
| 7,403,295 B2 | 7/2008 | Seo | | |
| 7,681,839 B2 | 3/2010 | Mickley et al. | | |
| 7,686,252 B2 | 3/2010 | Mickley et al. | | |
| 7,689,130 B2 | 3/2010 | Ashdown | | |
| 2003/0214415 A1 * | 11/2003 | Shaw | ............ | 340/685 |
| 2004/0026348 A1 * | 2/2004 | Shaw | ............ | 212/276 |

OTHER PUBLICATIONS

Stephen Grande helicopter remote manipulation of external sling loads, American Helicopter Society presentation May 27-29, 2009.

* cited by examiner

*Primary Examiner* — Tarifur Chowdhury
*Assistant Examiner* — Isiaka Akanbi
(74) *Attorney, Agent, or Firm* — Mark Clodfelter

(57) ABSTRACT

A method for automatically guiding a lifting device on a lifting apparatus to a lifting point on a load is disclosed. A beacon is associated with the lifting point on the load has a plurality of lights arranged in a predetermined pattern. A sensor on the lifting apparatus detects the lights and provides signals to a processor. The processor calculates location of the lifting point, and develops signals that directs the lifting apparatus, or an operator of the lifting apparatus, to engage the lifting point with a lifter on the lifting apparatus. The load may then be lifted and moved.

4 Claims, 9 Drawing Sheets

AUTOMATED SYSTEM FOR LOAD ACQUISITION AND ENGAGEMENT

CROSS REFERENCE TO RELATED APPLICATIONS

This application claims the benefit of Applicants provisional application No. 61/387,515, filed Sep. 29, 2010, and further claims priority from Applicants patent application Ser. No. 12/932,664, filed Mar. 2, 2011 which is incorporated by reference herein, and which in turn claims the benefit of provisional application no: 61/339,259, filed Mar. 2, 2010, which is also incorporated by reference herein.

FEDERALLY SPONSORED RESEARCH

This invention was made with government support under contract no: W911W6-08-D-0007, contract no: W911W6-06-C-0063 and contract no: W911W6-06-C-0021, awarded by the Army Aviation Technology Directorate. The government has certain rights in the invention.

FIELD OF THE INVENTION

This application relates in general to the field of external load acquisition by a lifting apparatus. More specifically, this application relates to using a sensor, beacon, and processor associated with or integrated with the lifting apparatus to acquire and calculate relative position information between a load and the lifting apparatus for the purpose of accurate, safe, fast, and/or automated acquisition and connection of a load to the lifting apparatus.

BACKGROUND OF THE INVENTION

Prior Art

Typically, helicopters pick up external loads using a rope, chain or the like attached at one end to the helicopter. In some instances, the helicopter may be provided with a winch and wire rope by which to lift a load. At the other end of the rope or chain is a hook or loop for engaging a clevis or hook attached to a sling or net that supports the load. The clevis is typically put on the hook by a person standing under the hovering helicopter and lifting the clevis onto the hook. This is a dangerous procedure because the person lifting the clevis into the hook is exposed to flying debris, dirt and dust from the helicopter downwash. In addition, the hook or clevis is relatively heavy, and a swinging hook can injure the person. Alternatively, the helicopter may land so that the person can crawl under the helicopter to make the connection. This expends time, and is inefficient because of the unpredictability of where the hook may be. In some instances, the helicopter may land on the hook, forcing the helicopter to take off again in an attempt to reposition the hook so the load can be attached. In both cases, ability of the person to catch the hook and engage the clevis onto the hook allows a connection to be established between the load and the helicopter. However, if the helicopter is not directly over the load, when lifted, the load may drag or swing, possibly damaging the load or hitting the hook-engaging person. Similar circumstances apply to the crane lifting a load, particularly with respect to large cargo cranes where the operator may not be able to clearly see location of the load or the attachment point on the load.

SUMMARY OF THE INVENTION

This invention comprises a method for locating and picking up a load wherein a load lifting contrivance including a load lifter is equipped to sense location of a plurality of lights associated with a load lifting point on the load. A computer calculates at least distance and direction between the load lifting point and the load lifter, and provides signals so that the load lifting contrivance is directed so that the load lifter engages the load lifting point. The load may then be lifted and moved.

DETAILED DESCRIPTION OF THE DRAWINGS

Figure 1:
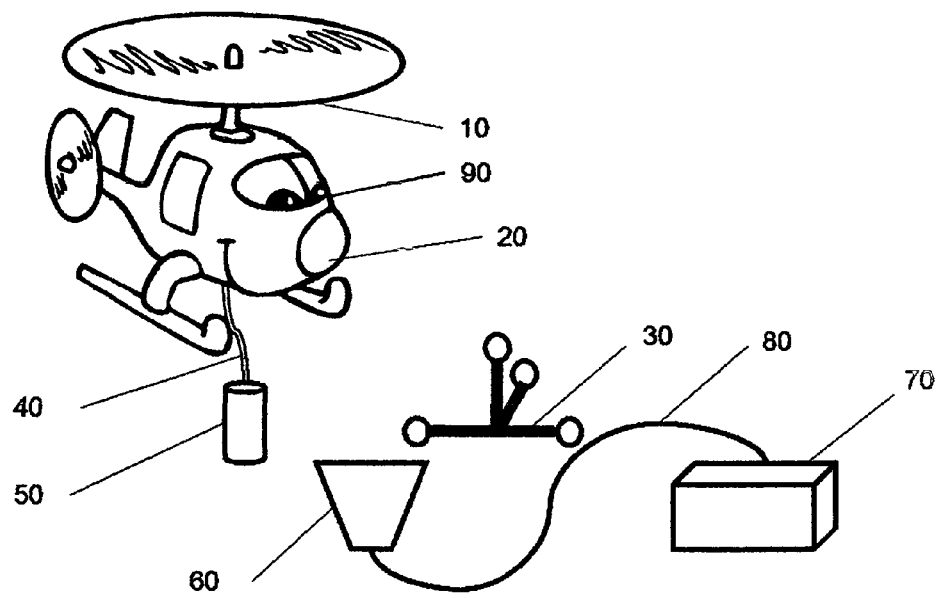
FIG. 1 is an overall schematic view of one embodiment of the present invention.

FIG. 1 illustrates one embodiment of the present invention. In this embodiment, there is a helicopter (illustrated), a crane, forklift or any other lifting device 10 having a sensor 20 attached thereto, the sensor 20 configured to acquire signals from a beacon 30 associated with a lifting point on the load. Throughout this disclosure, the term "lifting device" and helicopter, crane, forklift, pallet mover and the like are used interchangeably, it being understood that the present invention is not limited to any specific load lifting and moving device, but may be applied to any load lifting device, as should be apparent to one skilled in the art. Also, the present invention lends itself well to robotic lifting and moving devices, such as remotely controlled and GPS operated helicopters, pallet lifters/movers that are operated by a computer and position sensors, automated cranes and other similar lifting and moving devices. All of these lifting and moving devices are fitted with a load lifter, which may be a hook, ring, clevis or the like. In the present invention, an automated, electrically operated grapple is provided as a load lifter attached to a load lifting device. A receptacle attached to the load serves as an attachment point, and which receives the grapple, which is locked in the receptacle.

Beacon 30 is attached in a known orientation on or near the load, which as stated, allows 6 degree of freedom information to be calculated for the lifting point, and in one embodiment to develop control signals for automatically guiding a helicopter, crane or other lifting apparatus 10 to engage the load lifting device with the lifting point.

Figure 11:
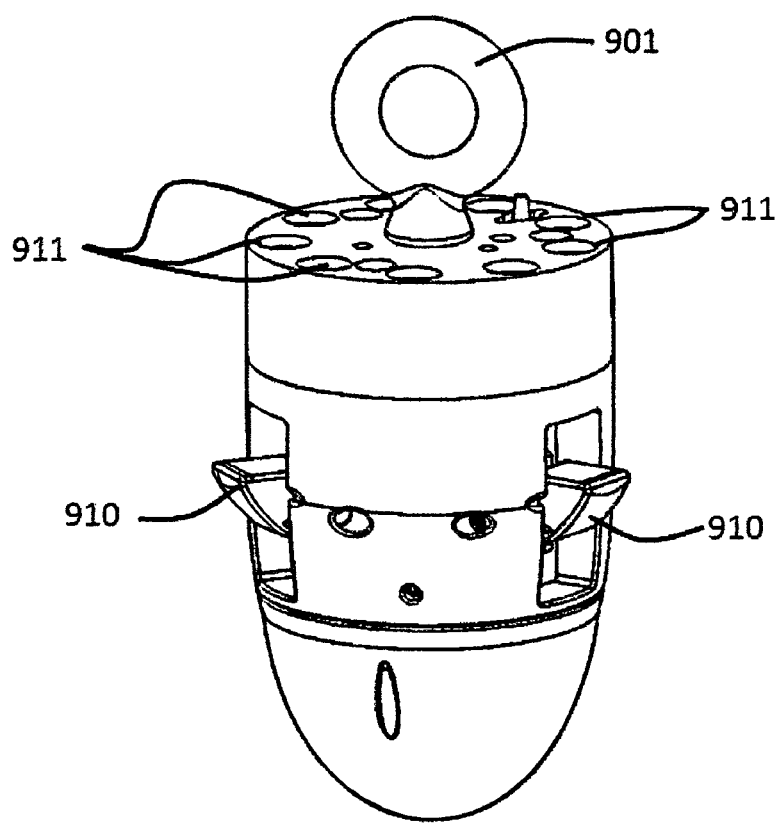
FIG. 11 is an exterior view of a grapple of the instant invention.

In another embodiment, instructional signals are developed and provided to a pilot of a helicopter, or operator of a crane. A rope, chain, strap or the like 40 of a known length is attached at one end to helicopter or crane 10, with an automated grapple 50 attached to the other end of rope 40, as by a hook or loop 901 as shown in FIG. 11. A receiver 60 is configured to be engaged by grapple 50, and is attached to a load 70 by a rope, chain, strap, net or the like 80. A computer processor 90 receives the signals from sensor 20, calculates the six degrees of freedom information and develops the control or informational signals to guide the automated grapple to the receiver on the load.

Sensor 20, which may be a digital camera, is attached to helicopter or crane 10 in a position and orientation to receive signals from a load 70 generally underneath the helicopter or crane 10. As such, the sensor field of view, which may be on the order of 15-25 degrees or so, includes an area directly underneath the helicopter or crane, and around the helicopter or crane for some distance. In some embodiments, sensor 20 only needs to typically be at a distance of about 1 to 30 or 40 yards or so, depending on altitude of the helicopter. In other embodiments, and as will be further explained, a sensor 20 on a helicopter or loading crane may need to have a greater field of view, such as perhaps 45 degrees or so to encompass a plurality of loads in order to select a predetermined load for transport. In this instance, lens 120 (FIG. 3) may be a lens that encompasses a somewhat wider field of view, so that a plurality of beacons associated with loads are in a field of view of the sensor.

Light beacon 30 is associated with load 70 by being mounted thereon at a known location on load 70, placed on the ground at a known location near load 70, or placed or mounted on a platform carrying load 70, such as a ship, truck or other conveyance. As such, since the beacon serves as a reference point by which to guide the helicopter or crane in six degrees of freedom, it is important that orientation between beacon 30 and receiver 60 is a priori known. In some embodiments, This is accomplished by placing the beacon a known distance from the receiver, such as 1-3 feet or more, with pointing indicia on the beacon pointing directly toward the receiver attached to the load. As such, the person putting the beacon on the load must measure the distance from the beacon to the receiver, and ensure that the pointing indicia points toward the receiver. In other embodiments, the light sources at a known orientation on the beacon may be a different color or wavelength to further assist in determining orientation of the beacon. With this construction, there is no need to ascertain any further orientation of the beacon with respect to the receiver, the processor is configured to simply look for orientation of the beacon and then apply the measured offset between the beacon and receiver. In other embodiments, other references may be used to align the beacon with the receiver, as will be further explained. In another embodiment, a beacon may be placed at a known location on a forklift pallet, and a forklift equipped with a processor of the present invention. As such, the forklift may be automatically guided to pick up a designated pallet and its load, and transport the pallet and load to a desired location. In a warehouse environment, specific locations where pallets or the like are stored may be designated by another beacon, or a permanently installed string of beacons may be installed along shelves, the floor, a wall or other storage areas. In this instance, each beacon on the string (or individually placed beacons) would uniquely identify a respective location to a forklift, which would then allow the forklift to pick up a pallet and load and transport it to the designated location.

Figure 2A:
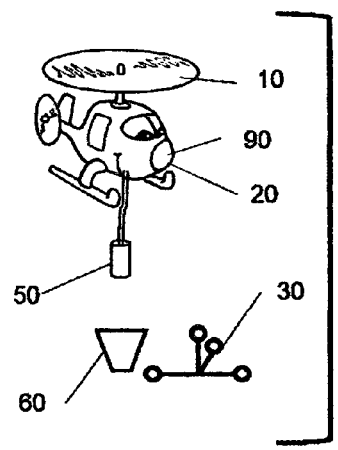
FIGS. 2a-2c are schematic diagrams illustrating operation of the system in accordance with an embodiment of the present invention.
Figure 2B:
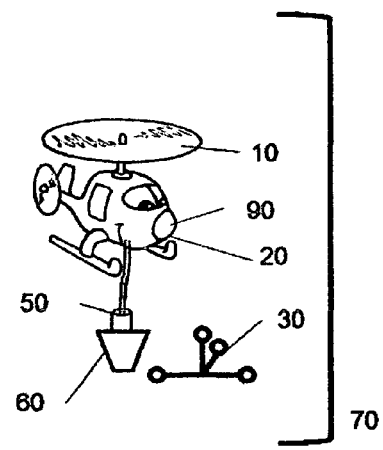
Figure 2C:
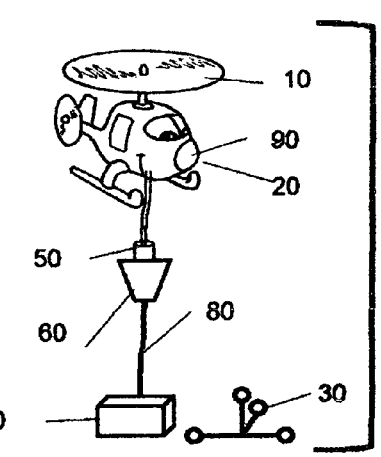

FIGS. 2A-2C generally illustrate operation of the system for attaching loads. FIG. 2A shows that sensor 20 detects beacon 30, passes its information to processor 90, which directs lifting device 10 so that automated grapple 50 is directly over receiver 60. As illustrated in FIG. 2B, when sensor 20, observing beacon 30, and processor 90 determine that grapple 50 is in the right position, processor 90 directs the lifting device to lower grapple 50 until it engages receiver 60. As shown in FIG. 2C, after grapple 50 is engaged in receiver 60, processor 90 commands lifting device 10 to lift grapple 50 and load 70, which remains attached to receiver 60 with sling, rope or net 80. In some embodiments, sensor 20, beacon 30, and processor 90 may continue to guide lifting device 10 for a distance so that load 70 is lifted directly vertically, and therefore does not swing. In other embodiments, the load may be monitored to its destination, and the grapple disconnected when it is detected that the load is placed on the ground or other platform.

Figure 3:
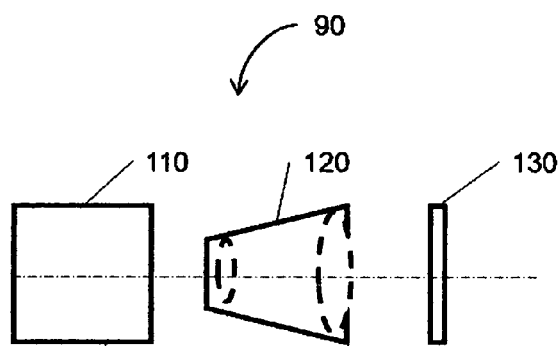
FIG. 3 is a block diagram illustrating, by way of example only, a sensor assembly of the present invention.

FIG. 3 illustrates one embodiment of a sensor 20. In this embodiment, there is a camera 110, a lens 120, and a filter 130. Filter 130 is a narrow band-pass filter designed to pass only wavelengths associated with beacon 30, and reject other wavelengths of light. In other embodiments, other sensors to detect beacon 30 include LADARs, RADARs, wideband light cameras such as cameras sensitive to infra-red and ultraviolet light, and other sensors, with a respective beacon providing the appropriate wavelengths of light, or other radiation in accordance with the present invention. In any case, sensor 20 receives the light from a beacon and converts the light into electrical signals that are provided to a processor, which calculates at least distance and direction information from the lifting device to a load to be acquired and lifted.

Figure 4A:
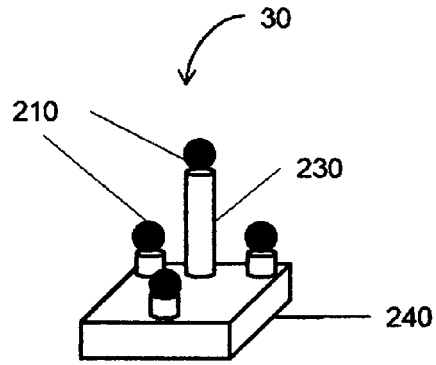
FIGS. 4a and 4b are schematic diagrams illustrating, by way of example only, a beacon of the present invention.
Figure 4B:
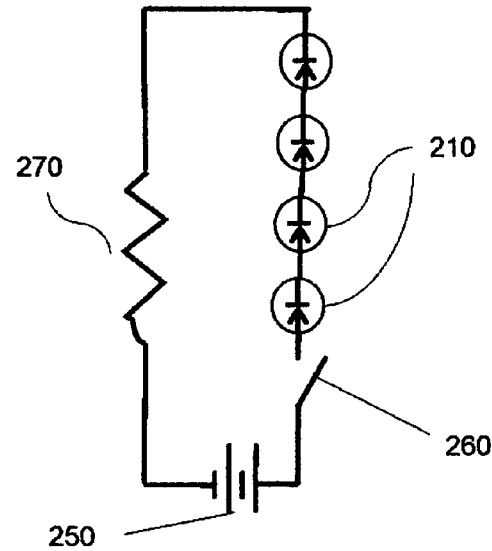

FIGS. 4A and 4B illustrate, by way of example only, one embodiment of beacon 30. In this embodiment, there are four sources of light 210, which may be LEDs, incandescent lamps, chemical fluorescent lamps, electrofluorescent illumination devices or the like, and which are disposed on a mounting body 240 in a pattern so that at least one of the light sources 210 is on an out-of-plane pedestal 230. In embodiments where lights are used, and particularly where LEDs are used, a background for the LEDs is dull black or other dark color so that the LEDs are highlighted against the dull, dark background. In the specific example of a beacon as shown in FIG. 4A, the four sources of light 210 are equidistant from a base of pedestal 230, with the axes of each of the light sources being orthogonal. From directly overhead, the four sources of light form a T, with three of the lights across the top of the T, and the fourth light at the bottom of the T. As such, the light at the base of the T, which is used as a pointer, is aimed directly at the receiver in order to establish orientation of the beacon with respect to the receiver. Thus, four sources of light 210 form a first plane triangle on base 240, with a second plane triangle formed by light source 210 on pedestal 230 and adjacent light sources 210. This configuration of a beacon 30 forms a pattern of light by which six degree of freedom information can be calculated by processor 90, and used as a reference by which a helicopter or crane can be guided so that automated grapple 50 engages receiver 60. As noted above, sources of light 210 may be light emitting diodes (LEDs), lasers, incandescent lamps, fluorescent lamps, or other light sources. In other embodiments, the sources of light may be placed in the same plane, or fewer than four light sources may be used. Here, the light source on pedestal 230 may be omitted, with just the three lights at the corners of the triangle used as a beacon. In this instance, with the geometry of the triangle being known, as for instance an equilateral triangle, then the location of the beacon can be easily calculated from views taken above the triangle. However, a beacon in the form of a plane equilateral triangle will not easily provide direction to a receiver for an automated grapple. In order to easily indicate direction to the receiver, the triangle formed by the beacon may be an Isosceles triangle where the apex of the triangle formed by the longer sides points to the receiver, a right triangle where one of the sides points toward the receiver, a scalene triangle where a predetermined side points toward the receiver or even a V shape similar to an arrow. In other embodiments, an arrow configuration may be used to point to the receiver, if for no other reason than to simplify placement by a ground crew person. The important aspect here is that the beacon be configured to provide a direction indication to the receiver, with distance of the beacon to the receiver being a measured, predetermined parameter. In a simple embodiment, the measurement may be quickly achieved by a stick with a marking on it where the beacon should be, with the end of the stick placed at a reference point against the receiver, and the beacon placed at the marking on the stick that indicates the predetermined distance. In another embodiment, a stick or rod of a length corresponding to the predetermined distance may be attached directly to the beacon so that the pointing indices of the beacon that point to the receiver lie along the length or axis of the rod or stick, so that all a ground crew person needs to do is place the beacon on the load with the stick or rod touching the receiver. In a variation of this embodiment, beacon lights may be placed directly on the stick to assist in locating the receiver. In this embodiment, a light at one end or near one end of the stick may be a different wavelength or color to indicate proximity of the beacon or receiver. In another variation, the stick or rod may be a telescoping rod similar to an antenna on a portable radio, and which is mounted within the beacon so that the rod may be pushed back into the beacon after placement or for storing the beacon. Any number of segments of the telescoping rod may be used to indicate a predetermined distance, or the entire length of the extended telescoping rod may be used for measurement of the predetermined distance. In yet another embodiment, rather than a stick or rod, a string or cord of a length corresponding to the predetermined distance, or having markings thereon indicating one or more predetermined distances, may be attached to the beacon at an end of the pointing indices of the beacon, so that all a ground crew person would need to do is stretch the cord (with the end thereof not attached to the beacon touching the receiver) between the beacon and receiver and attach the beacon to the load at the predetermined distance, ensuring that the pointing indices on the beacon point to the receiver. In this instance, the cord may be housed in a housing on the beacon that retracts the cord after the beacon is placed. Similarly, a spring loaded tape measure may be built into the beacon for measuring distance of the beacon to the receiver. In yet other embodiments, the distance between the beacon and receiver may simply be measured by a tape measure or ruler, yardstick or the like.

As shown in FIG. 4B, by way of example, power for lights 210 is provided by a battery 250, and controlled by a switch 260. Resistor 270 provides a return path for current to battery 250 where LEDs or other lamps requiring such a resistor are used for light sources 210. In some embodiments, the light sources 210 may be modulated according to a unique code that distinguishes and identifies each load 70 of a plurality of loads 70 or serves to identify each light source separately, as will be further explained.

Figure 5:
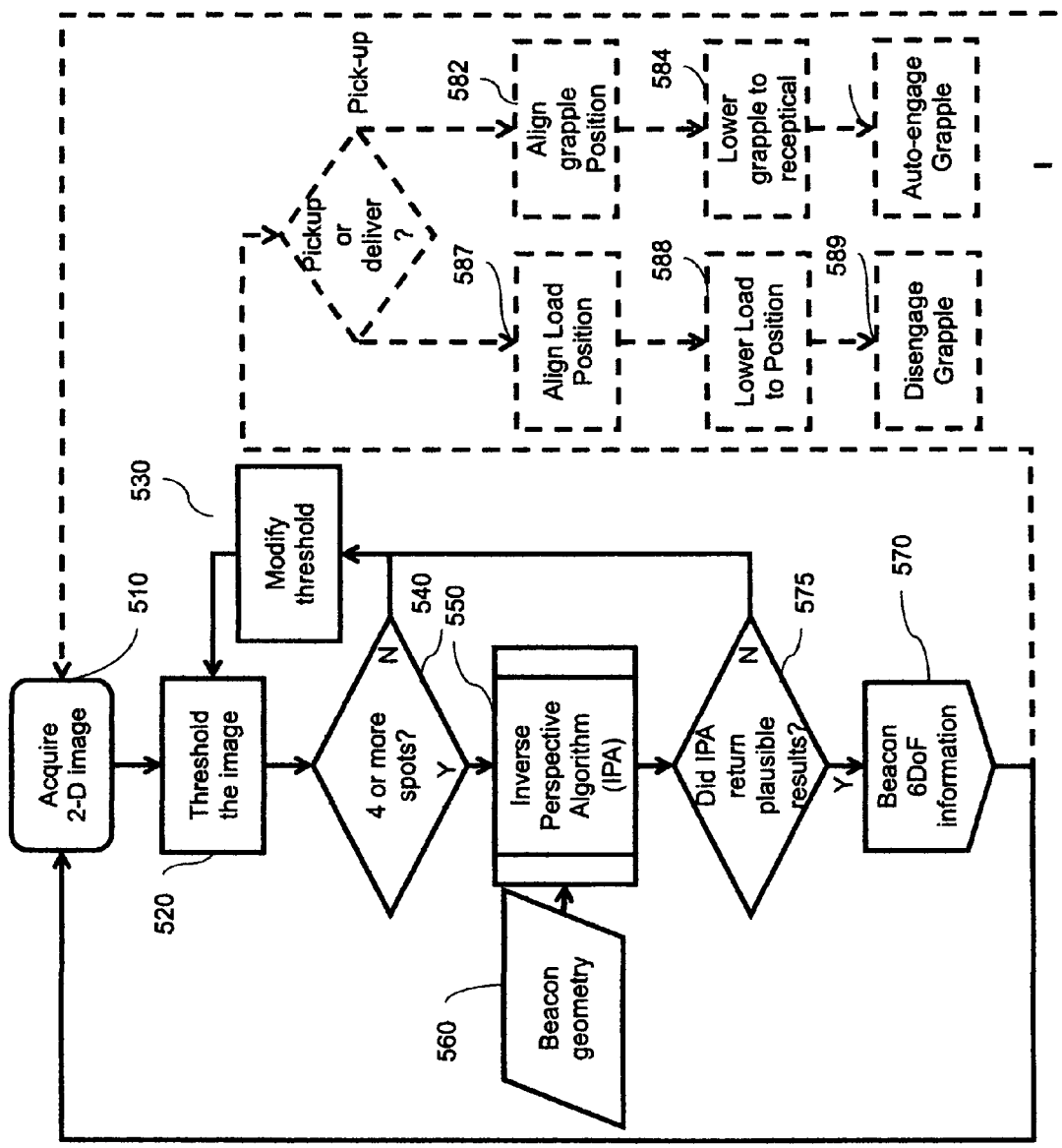
FIG. 5 is a flowchart illustrating one example of a beacon processing algorithm of the present invention.

FIG. 5 shows, by way of example, one embodiment of logic flow that may be utilized by processor 90. The algorithm of FIG. 5 is a way for determining the relative six degree of freedom location of beacon 30 in the coordinate system of sensor 20. Here, at box 510, a two dimensional image including beacon 30 is acquired, and a light threshold applied at box 520. This threshold may correspond to a predetermined altitude at which a helicopter or crane must descend to or be lowered in order to acquire the beacon, or initially may be set at a highest level in order to increase a signal to noise ratio, after which the threshold is reduced as necessary at a predetermined altitude over the load in order to acquire the beacon. At box 540 the query is posed as to whether the geometry of the beacon is correct, i.e. is the correct number of beacon lights detected and are the lights generally in a beacon configuration as seen from any point above the beacon, as provided by a store of various lamp geometries at box 560. Such a store at box 560 may include a plurality of beacon lamp configurations where different configurations of beacons are used, with each beacon configuration in turn having a plurality of stored beacon orientations and sizes corresponding to various angles to the beacon and altitudes as seen from the relatively narrow field of view of the camera from above. Here, any views from a side or below the beacon are impossible due to a limited field of view of the camera lens, and simply result in an error signal or an indication that the beacon is not acquired. Where a remotely piloted or GPS guided helicopter is used, such a view in conjunction with altitude may be used to generate a signal to increase altitude in an effort to acquire the beacon, or modify the acquired image. Of course, a similar error indication may be provided to a pilot or crane operator. Initially, where a helicopter is approaching a load associated with a beacon from above, If the beacon geometry is not correct, then the logic flow proceeds to box 530 where the light threshold is lowered in order to increase the amount of incoming light to be considered, and acquire all light sources of the beacon. Such lowering of the light threshold may be necessary in dusty, snowy or wet conditions where downwash from a helicopter produces an inordinate amount of blowing dust, snow and water, partially obscuring lights 210 from sensor 20. As noted, the threshold is initially set at a highest level to accommodate lifting a load from a relatively bright or reflective concrete pad or ship deck. If the detected geometry is correct at box 540, the logic flow drops to box 550, where an inverse perspective algorithm uses the tamp geometry provided at box 560 to calculate beacon location at box 570. At box 575 a check is made as to whether the results make sense. Here, the inverse perspective algorithm may not have converged to a good result. For instance, if the result indicated that the grapple is 100 yards above the beacon, the result is flawed due the system being inoperable at that distance. Another flawed result might indicate that the beacon is at an angle out of the field of view of the camera. In these instances where there is an implausible result, the logic flow loops back to box 530 where the light threshold is lowered and the logic flow again falls through to box 575. In the instance where box 575 provides a logical result, the logic proceeds to box 570 where six degree of freedom information is calculated for the receiver. Here, with the relationship between the beacon and receiver being known, and the length of the rope attaching the automated grapple to the helicopter or other lifting device being known, the automated grapple of the present invention can then be guided into the receiver based on location and orientation of the beacon. These calculations are done rapidly so as to constantly update in real time, which may be at least 30 frames per second, the position of the grapple with respect to the beacon, and an inferred location of the receiver based on the predetermined offset. Using the six degree of freedom information of the beacon and inferred location of the receiver, error signals are generated until the grapple is over the receiver and dropped into the receiver at box 572, at which point the grapple is signaled to engage the receiver and the load lifted. At that point the system may continue to run until the load is placed on the ground, as shown at box 574, which may be sensed by load sensors or various switches, and the grapple signaled to release the receiver at box 576. In other embodiments, the system flow may be terminated after the load is lifted, and the grapple manually released by a pilot or the like sensing or receiving an indication that the load is at the destination or on the ground.

Figure 6:
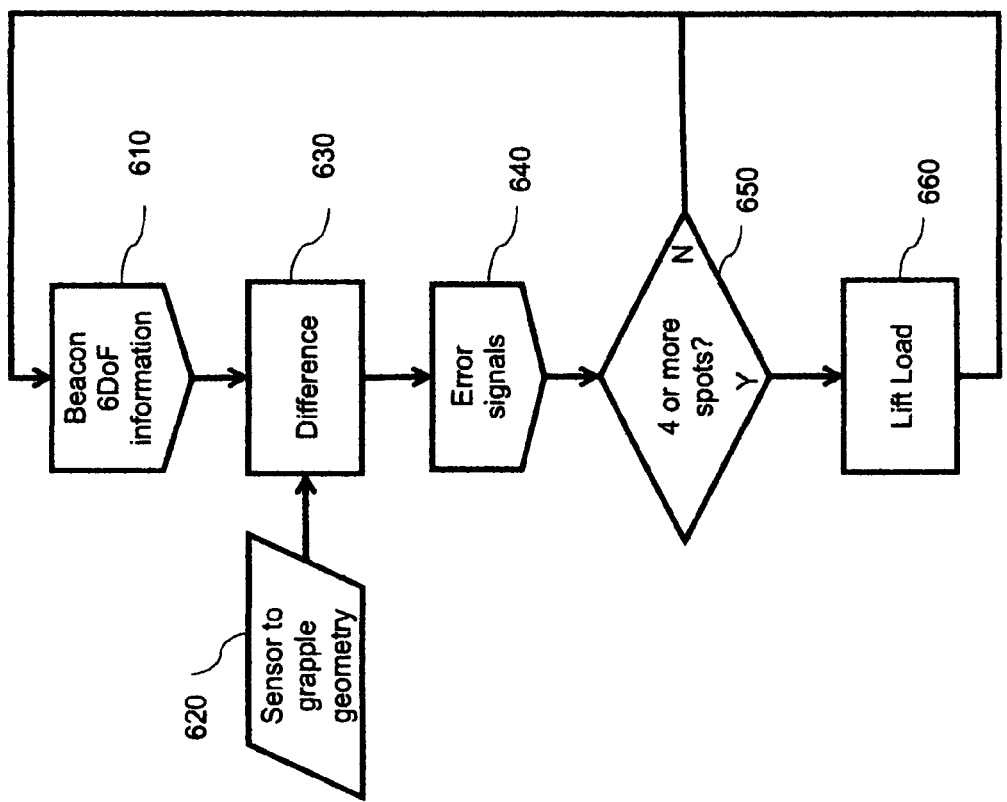
FIG. 6 is a flowchart illustrating calculation of error signals of the present invention.

FIG. 6 shows one example of an algorithm logic flow that may be utilized by processor 90. The algorithm of FIG. 6 uses calculated relative six degree of freedom location and data about the geometrical displacement between sensor 20 and grapple 50 to determine the relative location between beacon 30 and grapple 50. This information is used to guide helicopter or crane 10 in a manner that engages automated grapple 50 with receiver 60. In this algorithm, the six degree of freedom information indicating location of the beacon, and an inferred location of the receiver calculated at box 610, is provided to box 630 along with information related to the geometry between the sensor 20 and automated grapple 50, which would include the length of rope, chain or the like 40. At box 630 a difference between location of the automated grapple and an inferred location of the receiver is calculated from the information from boxes 610 and 620, and error signals are developed at box 640 and provided to an autopilot. At box 650 the query is posed as to whether the error is zero, and if not, then the logic flow loops back to box 610 and the difference is once again calculated. If the error is 0, indicating that the grapple has engaged the receiver, then the helicopter lifts the load, or a pilot or crane operator is given an indication that the grapple is engaged with the receiver and the load is safe to lift.

In another embodiment, the error signals may be used to develop instructions to a pilot or crane operator so that they can guide the automated grapple into the receiver. These instructions may be in the form of a graphical interface that illustrates lateral and vertical distances between the grapple and receiver, or may be presented simply as text that shows these lateral and vertical distances. Both a graphical interface and a readout of such distances is also contemplated by the present invention.

The algorithm of FIG. 6 is appropriate in the case where the control system of helicopter or crane 10 accepts error signals from box 640 as an appropriate input and moves grapple 50 to drive error signals 640 to zero, the correct position for grapple 50 to engage receiver 60.

Figure 7:
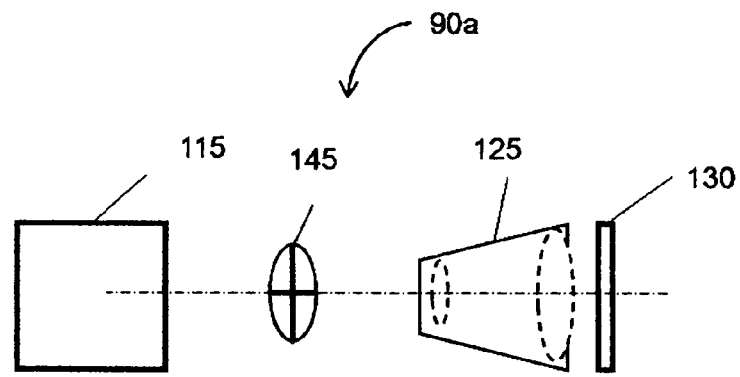
FIG. 7 is a block diagram illustrating one embodiment of the present invention.
Figure 8:
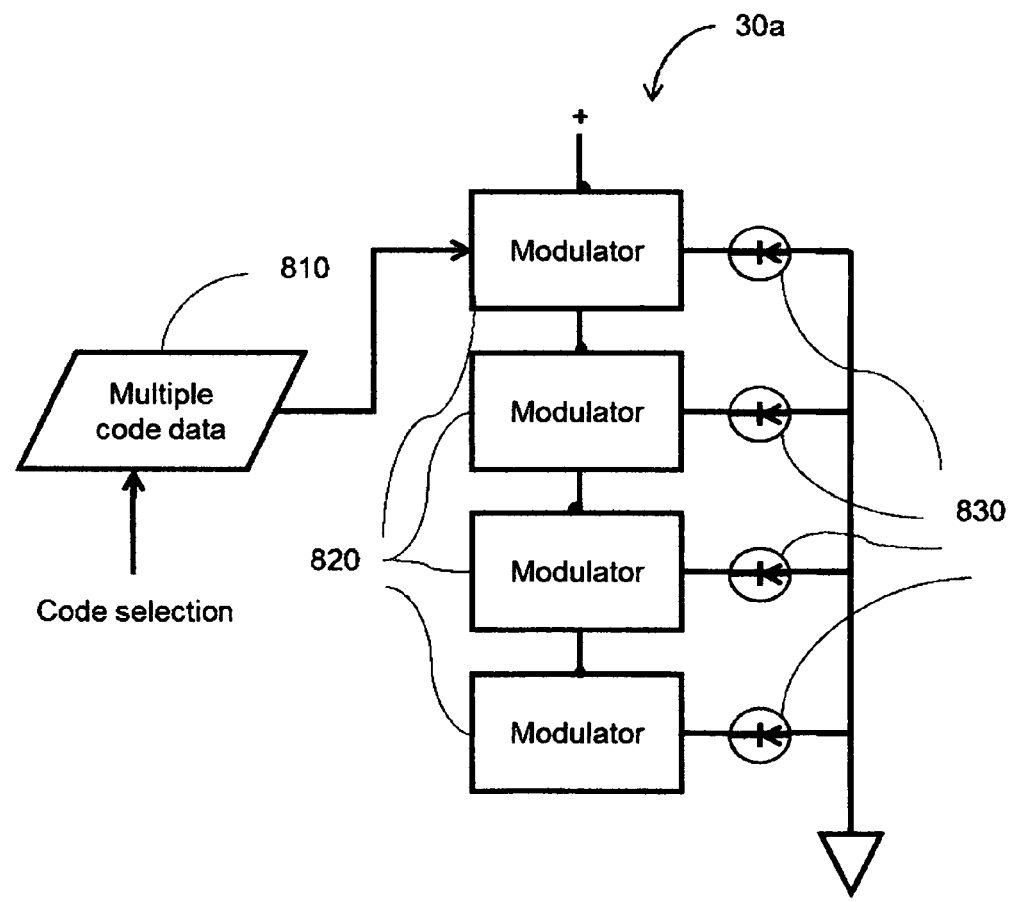
FIG. 8 is a block diagram illustrating another embodiment of the present invention.

FIG. 7 shows the use of a non-imaging embodiment of sensor 20. In this specific example, the focal plane of lens 125 is occupied by a quadrant detector 145 that detects all of the beacon lights as a single blur spot. Where the lights are modulated, the individual modulations applied to each of the lights is detected from the blur spot. Filter 130 is the same as in the first embodiment, and filters out all wavelengths except those provided by beacon 30. The rest of sensor 20 is camera processor 115 that determines vertical and horizontal position of the blur spot of light from the output of quadrant detector 145. In this embodiment, sensor 20 provides only azimuth and elevation to beacon 30. Other position-sensitive detectors such as lateral-effect position sensitive detectors may be used in place of the quadrant detector 145. FIG. 8 shows an alternate circuit for beacon 30. Here, four codes from a selection of codes stored in code store 810 are transmitted to four modulators 820. These modulators power four light sources 830, which are selected to operate at the highest modulation frequency and may be LEDs, LED laser devices, electroluminescent devices, incandescent lamps or other similar devices. In this embodiment, modulated light sources 810 are mounted as shown in FIG. 4 or in another of the disclosed patterns in a single plane, with the modulated light sources of a plurality of such beacons being associated with respective loads to be picked up and moved or transported. In other instances, such a modulated beacon may be used on a single load to convey information about the load, such as the destination. The modulation code for each such beacon is unique, and thus uniquely identifies each load. Within a processor 90 of the helicopter or crane, corresponding software associates each load with a respective destination, a particular lifting device, a particular order in which the loads are to be moved, transported or loaded, or for any other purpose.

Figure 9A:
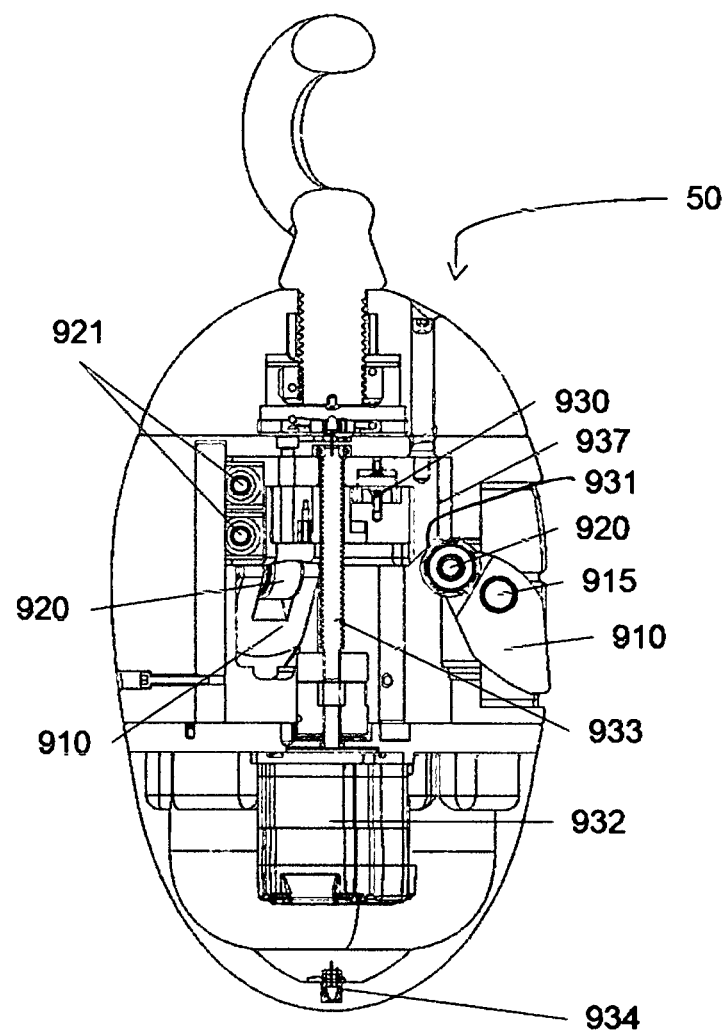
FIGS. 9a and 9b are cut away views illustrating operation of a the hook operation in accordance with an embodiment of the present invention.
Figure 9B:
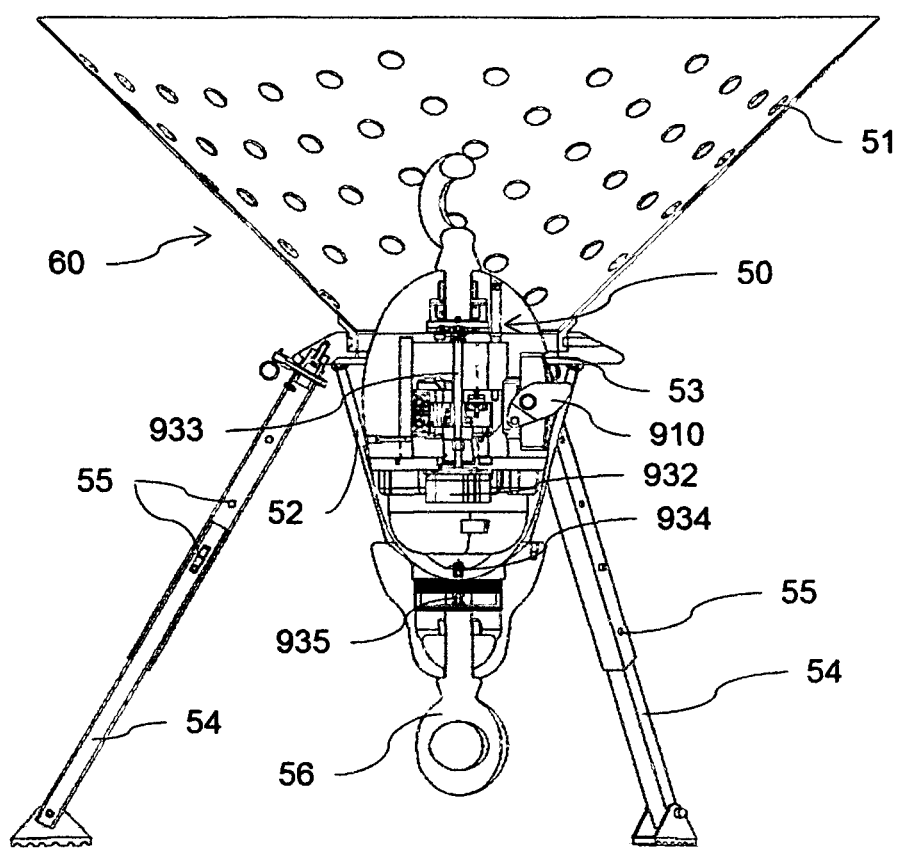

FIG. 9A illustrates by way of example one embodiment of grapple 50. The critical working parts of grapple 50 are latches 910 that engage receiver 60. A plurality of latches 910, such as three or four, are disposed around the circumference of grapple 50, as shown in FIG. 11. FIG. 9A illustrates latches 910 in a retracted state before engagement to receiver 60. FIG. 9B illustrates latches 910 in a deployed state after engagement to a receiver 60. Referring back to FIG. 9A, grapple 50 is a powered electrical device, with power being provided from a helicopter, crane or the like via an electrical cable (not shown) that extends down to the grapple and is tethered to rope 40. In another embodiment, an internal battery (not shown) may provide power to grapple 50. In any case, an electrical motor 932 internally fixed within grapple 50 drives a lead screw 933, which in turn is threadably engaged with and which raises and lowers a carriage 930. A plurality of pairs of rollers 921 riding in respective tracks, guides or the like guides carriage 930 in its upward and downward travel. Pressure switches, contact switches, magnetic switches or other types of known switches may be used to develop signals that indicate when carriage 930 is at the full extent of its upward or downward travel and remove power from motor 932. Carriage 930 is provided with cams 931, one for each of latches 910, and a following locking face 937. Each of latches 910 pivots about a load bearing boss or axle 915, and is operated by a roller cam follower 920 bearing against cam 931 and locking face 937. Springs (not shown) that bias the latches to the position shown in FIG. 9A may be used to ensure positive retraction of the latches from an extended position. A Hall effect sensor 934 mounted at a lower end of grapple 50 detects a magnetic field from a magnet at a bottom of receiver 60 when the grapple is engaged with the receiver.

As shown in FIG. 9B, which shows a grapple 50 engaged therewith, receiver 60 is constructed having a funnel-like hopper 51 that serves to guide grapple 50 into a receiver body 52. Hopper 51 may be about 2 feet to about 3 feet or so in diameter in order to catch a grapple 50 and guide it into engaging relation in receiver body 52. When Hall effect sensor 934 detect the magnetic field from magnet 935 at the bottom of receiver body 52, a signal is provided to cause motor 932 to drive lead screw 933 in a direction that lowers carriage 937 (FIG. 9A) so that cam faces 931 bear downward against cam follower rollers 920, causing latches 910 to deploy outward to the position shown in FIG. 9B and engage a ledge or opening 53 of/in receiver body 52. Once deployed, the cam roller followers are locked against locking faces 937, and cannot be backdriven. The receiver body is further provided with legs 54 that are extended and locked against a load to stabilize the load, as by detents and openings 55, and a ring or hook 56 by which to connect a clevis or hook to a sling or net holding the load.

FIGS. 9A and 9B illustrates the operation of the grapple 50. FIG. 9A shows grapple 50 ready for engagement with a receiver 60. Grapple 50 enters receiver body 52 and is lowered until latches 910 reach groove or opening 53 in receiver body 52, whereupon they extend into the position shown in FIG. 9B. As noted, latches 910 can be extended and retracted by motor 932 as shown in FIGS. 9A and 9B, causing latches 910 to be pivoted about a load bearing boss or axle 915 and contacting a corresponding load bearing ledge or opening 53 in an inner part of receiver body 52. As shown in the embodiment of FIGS. 9A and 9B, when grapple 50 is raised by lifting means 10, latches 910 contact a groove or opening on the interior of receiver body 52, and lift the load.

In order to release the load 70, latches 910 are retracted. This can occur as described above by driving motor 932 (FIGS. 9A and 9B) in a direction that moves carriage 930 upward, releasing latches 910 from locking faces 937 and cams 931, which causes the latches to retract to the position shown in FIG. 9A. In another embodiment, a mechanical attachment may be used to pull and pushes the latches to engage/disengage the latches. When disengaged, grapple 50 can now be lifted free from receiver body 52. In operation, sensor 20, comprising camera 110, lens 120, and filter 130 (FIG. 3) senses the beacon as the grapple approaches the beacon from above and comes into range of the sensor. Sensor 20, observing beacon 30 (FIG. 1), generates an image including the spots of light from the beacon. These spots of light and their orientation, when seen from above, depict the entire six degrees of freedom (6 DoF) between sensor 20 and beacon 30. For example, the centroid of the spots describes the direction to beacon 30, the distance between the spots describe the range to beacon 30, and the relative location of the spots describe the angular information of pitch, roll, and yaw. Filter 130 preferentially passes the wavelength of light sources 210 if the source is narrow band, such as an LED or a laser. Filter 130 is not necessary, but can improve system performance.

Processor 90 (FIGS. 1, 3,) uses an algorithm such as, for example, the algorithm described in FIG. 5, to determine the six degree of freedom from the measured location of the light sources 210 (FIG. 4A) on beacon 30. The 2-dimensional image of the scene containing beacon 30 is acquired as described above at box 510. As noted, and where used, filter 130 (FIG. 3) blocks most the light except for light from sources 210, 810, which increases a signal-to-noise ratio, improving range and performance of the system. This image is compared to a threshold function at box 520 (FIG. 5), and received light spots exceeding the threshold are processed. At box 540 the query is posed as to whether the spots pass the threshold. If fewer spots are detected than the number of lights on the beacon, no data is passed on, and the logic flow loops to box 530 to modify the threshold. The function at box 540 contains limits such that if no lights are in the camera field of view, the threshold is not set so low that noise dominates. Rather, signals are generated that instruct the pilot or remote control to lift the lifting apparatus in an effort to acquire the beacon. The function at box 540 also checks whether the relative location of the spots in the image are physically possible. For example, there is no possible orientation of the geometry of the beacon such that all four spots of light fall in a straight line, or can be seen from below. Where the spots of light from the beacon are properly detected at box 540, the logic proceeds as described above to box 550.

Figure 10:
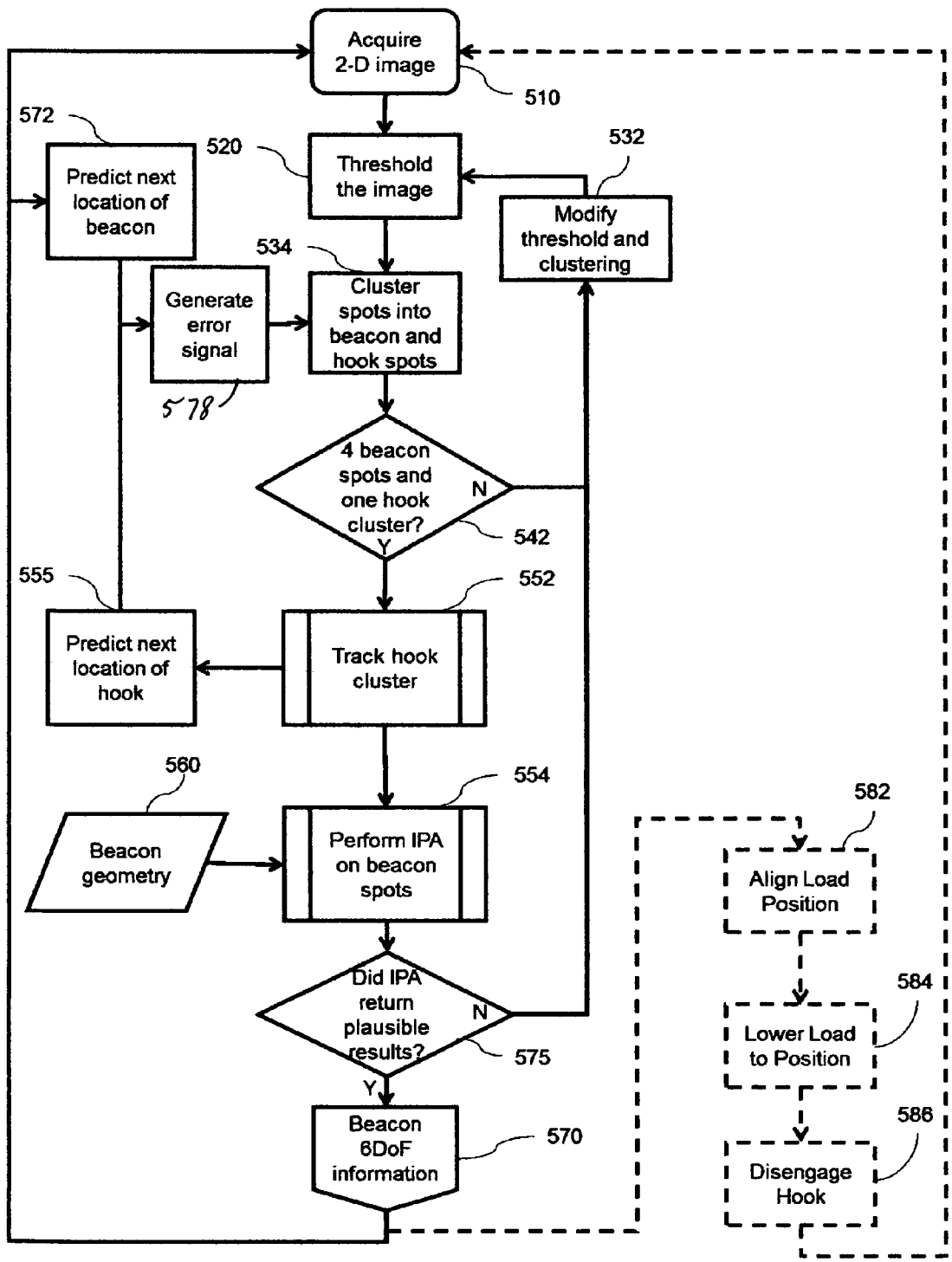
FIG. 10 is a flowchart illustrating operation of one algorithm of the instant invention.

In yet another embodiment, and as shown in FIGS. 10 and 11, a second (or third) beacon is placed on the grapple itself, and which is viewable by sensor 20. This beacon may only be one light, but several lights provide continuity where ring 901 or rope 40 may temporarily obscure a single light from sensor 20. Here, swinging of the grapple, which is inevitable when the grapple extends from a helicopter, may be at least detected, and the grapple dropped into the receptacle when the grapple is predicted to be over the receptacle. Also, swinging of the grapple may be compensated for by error signals provided by detected swinging of the grapple and moving the helicopter. In this embodiment, and referring to FIG. 11, a plurality of light sources 911 may be positioned about the top of grapple 50 so as to be discernable by sensor 20. In processor 90, an algorithm such as the one in FIG. 10 is provided. In this algorithm, and as described for FIG. 5, the camera acquires an image at box 510. At box 520 the light threshold as described above is applied to the image, which as stated may be filtered by a bandpass filter to increase the signal to noise ratio. At box 534 the beacon on the load and the beacon on the grapple are clustered, or each grouped together as a single group, and distinguished as beacon spots corresponding to the lights of the beacon on the load, and a cluster of beacon spots on the grapple. The distinguished and clustered beacon spots are passed to box 542, where the query is posed as to whether the proper spots have been detected. If the answer is NO, meaning that not all the spots or too many spots have been detected, then the logic flow loops back to box 520 where the threshold is modified, as by raising or lowering the threshold as previously described, or raising the helicopter in the instance where the load beacon has not been detected. When the correct number of spots are detected, the logic falls through to box 552 where the grapple cluster associated with a swinging grapple is tracked. At this point the logic flow branches, and at box 555 the next location of the grapple is predicted. At box 555 prediction of where the hook will be in the next camera frame occurs by calculating the angle of the rope with respect to the helicopter. Here, a centroid of the clustered lights on the grapple is determined, and from the location of the centroid in the field of view of the camera sensor, the instantaneous angle at which the rope is currently at may be determined. This occurs where the camera sensor is mounted proximate a point where the rope connected to the grapple is connected to the helicopter, with the camera sensor looking straight down from the helicopter. As such, since the center of the camera field of view corresponds to a plumb position of the grapple, any displacement from the center of the field of view in any 2 dimensional direction corresponds to an angle that may be calculated, or looked up from a lookup table. In the latter instance, the size of the lookup table may be reduced as necessary by reducing the number of pixels in the camera field of view, for example by only considering one pixel of a group of pixels in X and Y directions, such as every $3^{rd}$ pixel, every $5^{th}$ pixel, etc. and considering only the selected pixels nearest the centroid. While this reduces accuracy somewhat, the receptacle is provided with a widened entrance for the grapple, as explained above, that allows for slight inaccuracies. In other embodiments, the camera may be mounted an offset distance from where the rope is connected to the helicopter, and the offset applied to displacement of the grapple from a plumb orientation. In other embodiments, the angle of the rope may be calculated. In either case, the next location of the grapple may be predicted from a history of where the grapple has been, and the type of oscillation determined, such as whether the grapple is swinging linearly, or whether there is a circular component to the swing. This may be determined by filters such as a Kalman filter. In any case, where the grapple is swinging too much, it can't be placed in the receptacle. In these instances, a typical maneuver is to lower the grapple directly to the ground, which stops the grapple, and then raise it straight up. In other instances, error signals may be generated at box 578, the error signals provided to the pilot or remote control system in order to move the helicopter in a manner to dampen swinging of the grapple. Where the swing is minor, the predicted location of the grapple and the calculated six degree of freedom location of the beacon associated with the load can be used to position the helicopter in order to lower the grapple into the receiver as the grapple swings toward the receiver.

The loop of boxes 534, 542, 552, 555, 572 and 578 runs continuously at a rate, such as at least 30 frames per second, that allows sufficient real time operation of the system to enable the system to engage a load. As such, the processor and operating system are selected to implement such real time operation.

In the other branch of FIG. 10, at box 554, the inverse perspective algorithm is performed on the current load beacon spots in conjunction with the beacon geometry provided from box 560, also as previously described. At box 575 the results are checked for validity, and if the results are not valid as described above, then the logic loops back 532 where the threshold is modified, and the logic falls through again to box 575. If the inverse perspective algorithm returns valid results, then at box 575 the logic falls through to box 570 where the six degree of freedom information is calculated for the load beacon. This information is provided to box 572 as previously described for predicting location of the grapple with respect to the receiver, and error signals calculated to move the helicopter and grapple closer to the receiver. When it is determined that the grapple is approaching the receiver, whether in a plumb orientation from the helicopter or swinging, the grapple is lowered into the receiver, the grapple locked in the receiver and the load lifted, as shown and described for FIG. 5.

In another embodiment, and in the system description related to FIG. 1, an additional beacon 30 may be placed at the delivery location to facilitate precision delivery. In this embodiment, processor 90 operates to locate placement of the load with respect to the load placement beacon, and generates error signals to direct the load to the located position. Here, as shown in dashed lines in FIG. 5, after the beacon information is located, the location where the load is to be placed is calculated at box 582, and error or control signals developed to position the helicopter or crane to lower the load at box 584, and after the load is lowered, the grapple is automatically disengaged at box 586. As previously stated, the control signals may be provided to a display that guides a pilot or crane operator to a proper location to place the load, as shown at box 587, and load-sensing devices within either the grapple or receiver, or both, sense when the load is placed at 588, and provide a signal that it is safe to retract latches 910 at box 589, freeing the grapple from the receiver. Where the grapple is replaced by a conventional hook or clevis, a person would disengage the load at box 589.

FIG. 7 shows the use of a non-imaging embodiment 90*a* for a sensor. In this specific example, the focal plane of lens 125 is occupied by a quadrant detector 145. Filter 130 is the same as in the first embodiment, and functions to block most of the light, and only pass light of a wavelength emitted by the beacon or beacons. The rest of the sensor 20 is the camera processor 115 that determines vertical and horizontal position of a spot of light from the output of the quadrant detector. In this embodiment, sensor 20 provides only azimuth and elevation information to a processor 90, which then calculates direction and attitude to the beacon. As described above, after direction and altitude are calculated, an offset is developed corresponding to the distance of the beacon from the receiver, and the grapple guided to the receiver.

Referring to FIG. 8, another embodiment for a beacon 30 is shown. In this embodiment, and as generally described above, four codes are selected from a plurality of codes stored in a code store 810. The plurality of codes and code store may be stored in a computer device separate from the beacon, and loaded into a memory of respective beacons when needed, or the code store may be loaded into each beacon and retrieved when needed, Significantly, where a plurality of beacons are being used in the same general area, each beacon is provided with its own unique code, with each unique code associated with instructions related to the respective load. The corresponding instructions for the beacons and their corresponding loads are preloaded into a processor 90 fitted to a lifting device (helicopter, crane etc), as by radio transmission, wired or optical connection. With this construction, when a helicopter or crane encounters an area where there are several loads to be transported or moved, a particular beacon may be manually selected by the pilot or crane operator (or automatically selected), and the helicopter or crane moved by the generated error signals (or manually as described) to pick up the load. The code associated with that beacon would retrieve the instructions related to the load and provide them to a pilot (or crane operator). In a related embodiment, processor 90 may be integrated into a control system of a remotely piloted or GPS controlled helicopter so that the load is picked up and delivered pilotlessly. This embodiment is particularly useful delivering supplies to troops in a combat zone. In yet another embodiment, information from the plurality of beacons may instruct the helicopter or crane operator that the loads are to be moved or transported in a particular order, codes from all beacons in the area are rejected except for the next load in the order of loads. This is particularly useful where cargo containers are loaded onto a cargo ship for several destinations so that the containers are loaded in reverse order with respect to the order of the ports of call the cargo will be unloaded at. In other words, the containers for the last port of call are loaded first, and the containers for the first port of call loaded last.

With respect to the codes stored in or retrieved by the beacons, and as stated, the code is transmitted to four modulators 820 (FIG. 8). These modulators power four light sources 830, which are capable of operating at the highest modulation frequency. Also as noted, these light sources may be LEDs, laser diodes, incandescent, electroluminescent or other electrically powered light sources that can be controlled by a modulator.

One simple code is a frequency code. Here, four sine waves of differing frequency, one for each of the light sources, may be used as long as frequencies are used that are not harmonic with each other. In addition, a square wave of differing frequencies may also be used, one unique square wave frequency for each of the four light sources to be modulated.

In another embodiment, a more complex code designed for maximum correlation and minimum cross correlation may be used. Examples of these codes include, but are not limited to, Kasami codes and Gold codes.

Another embodiment of a sensor is found in Applicants patent application Ser. No. 12/431,727, which as noted in incorporated by reference herein in its entirety. Sensor 20 in the non-imaging version of the sensor uses signal demodulators to determine code 810 from a code-transmitting beacon 30. If the code is a frequency based, the demodulator is a lock-in amplifier. If the code is a pseudo-random sequence, the demodulator is a correlator.

In another embodiment, four demodulators can be applied to the output of each of the four quadrants of detector 145 (FIG. 7). This yields data similar to sensor 20 of the first embodiment in that the location of each light source 110 is measured independently, and relative location measured in 6 degrees of freedom.

The non-imaging version of sensor 20 can be used for both location and identification of load 70 by integrating a code sequence into a respective beacon.

In yet another embodiment, both the imaging version of sensor 20 and the non-imaging version of sensor 20 are used together in such a manner so the non-imaging version provides identification and long range location, i.e. 200-500 yards or so, and the imaging version provides the end game control and pick-up as discussed in the first embodiment, which may be from about 40 yards or so.

In another embodiment of a beacon, the beacon 30 may be operated so that each of light sources 210 is turned on sequentially, either in a constant mode, or in a coded mode.

In another embodiment of the system, the automated connection between the grapple and receiver is deleted, and replaced with manual hook-up by a person, as is currently used in aviation and construction. However, the sensing and control system is still used to place grapple 50 in the proper location, allowing safer and faster operation.

In another system embodiment, an additional beacon 30 is placed at the delivery site. Processor 90 is programmed to place load 70 in the desired position relative to the extra beacon 30, and then to position receiver 60 on a landing spot and disconnect grapple 50. With this embodiment it is possible to place the load 70 on the back of a truck, even while moving, or on a boat or ship while moving. A rolling and pitching deck or truck bed should not be a problem where the helicopter is controlled by the military or limited-use civilian GPS, which is accurate to within inches.

According to the foregoing, we have provided a method of external load acquisition by helicopter, crane or similar lifting means. Our system uses a sensor, beacon, and processor to acquire and calculate relative position information between a load and a lifting platform for the purpose lifting, transporting, and delivering the load to a desired location. Our system does not require direct control by a person either for guidance of the lifting platform, or for attaching the load, allowing for accurate, safe, fast, and/or automated acquisition of a load.

While the above description contains many specificities, these should not be construed as limitations on the scope of any embodiment, but as exemplifications of the embodiments described. Many other variations are possible within the teachings of this disclosure. For example, with respect to the beacons, instead of emitting light themselves, could be mirrored reflectors such as concave, convex or retroreflectors, and provided with a shutter, such as an LCD shutter, that reveals and hides the reflectors to create a code using incident light. The reflectors could then be illuminated by a laser, light emitting diodes (LEDs), incandescent lamps, fluorescent lamps, or other light sources, including sunlight, and the reflected light detected by the position-sensitive detector.

Having thus described our invention and the manner of its use, it should be apparent to one skilled in the relevant arts that incidental changes may be made thereto that fairly fall within the scope of the following appended claims, wherein we claim:

1. A method of locating and picking up a load, comprising:
    associating a display comprising a plurality of lights with at least a location of at least one load lifting point on a load to be transported by a load lifting apparatus,
    on said load lifting apparatus, using a computer to convert said light from said display into electrical signals representative of at least distance and direction from a load lifter of said load lifting apparatus to said load lifting point,
    directing said load lifter of said lifting apparatus to said load lifting point using said electrical signals representative of at least distance and direction,
    engaging said load lifter with said load lifting point,
    picking up said load.

2. The method as set forth in claim 1 further comprising connecting an automated grapple to said load lifting apparatus, and connecting a receiver for said automated grapple to said load, said receiver being the lifting point associated with said display.

3. The method as set forth in claim 2 further comprising offsetting said display from said receiver.

4. The method as set forth in claim 2 further comprising using an electrically powered grapple to extend a plurality of latches into said receiver, locking said grapple into said receiver without assistance from a person.

\* \* \* \* \*